United States Patent [19]
Tymkewicz et al.

[11] Patent Number: 6,000,845
[45] Date of Patent: Dec. 14, 1999

[54] TEMPERATURE SENSING AND INDICATING DEVICE

[75] Inventors: John Tymkewicz, deceased, late of Westlake, by Allen Tymkewicz, executor; Richard Park, Parma; Gary Kloock, Berea, all of Ohio

[73] Assignee: Marlin Manufacturing Co., Cleveland, Ohio

[21] Appl. No.: 08/907,528

[22] Filed: Aug. 8, 1997

[51] Int. Cl.$^6$ ............ G01K 7/00; G01K 13/00; G01K 1/14

[52] U.S. Cl. ............................. 374/155; 374/163

[58] Field of Search ............... 374/163, 170, 374/208, 155

[56] References Cited

U.S. PATENT DOCUMENTS

| | | | |
|---|---|---|---|
| 3,241,370 | 3/1966 | Mertler et al. | 374/155 |
| 3,504,544 | 4/1970 | Tymkevicz | 374/155 |
| 4,198,676 | 4/1980 | Varnum et al. | 374/185 |
| 4,431,966 | 2/1984 | Pucciarello | 324/114 |
| 4,444,990 | 4/1984 | Villar | 374/208 |
| 5,044,770 | 9/1991 | Haghkar | 374/163 |
| 5,634,719 | 6/1997 | La Neve | 374/155 |
| 5,655,305 | 8/1997 | Fletcher | 374/170 |
| 5,813,982 | 9/1998 | Baratta | 600/398 |

FOREIGN PATENT DOCUMENTS

| | | | |
|---|---|---|---|
| 2038351 | 9/1992 | Canada | 374/163 |
| 0232899 | 8/1987 | European Pat. Off. | 374/163 |
| 0510880 | 10/1992 | European Pat. Off. | 374/163 |

*Primary Examiner*—Diego Gutierrez
*Assistant Examiner*—G. Verbitsky
*Attorney, Agent, or Firm*—James A. Lucas; Driggs, Lucas, Brubaker & Hogg Co., L.P.A.

[57] ABSTRACT

A temperature sensing and indicating device, comprising a housing, a microprocessor and an arm. The arm is retractable and extendible into and out of the housing, such that the length of the arm external to the housing can be varied in a predetermined manner. A probe having a temperature sensor therewithin is enclosed by the arm such that varying the external length of the arm exposes varying lengths of the probe whereby the exposed length of the probe is designed to be inserted into a medium such that the temperature sensor senses the temperature of the medium and converts the temperature sensed into a signal. Through the utilization of a programmable microprocessor, the signal is conditioned and converted and drives a display causing the display to provide a visual indication of the temperature sensed. The visual indication is comprised of a digital numeric display and an analog display.

17 Claims, 5 Drawing Sheets

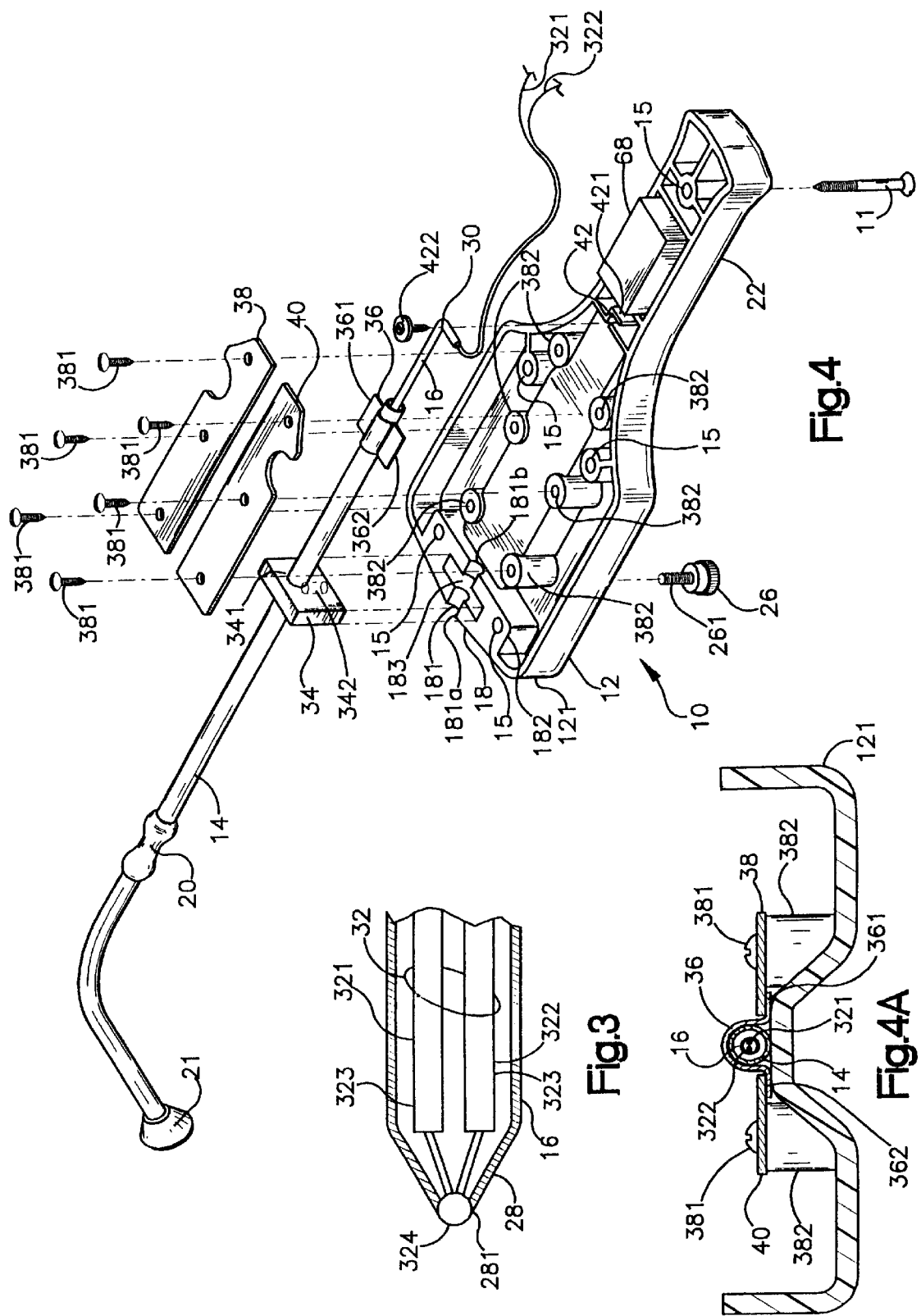

TEMPERATURE SENSING AND INDICATING DEVICE

BACKGROUND OF THE INVENTION

The present invention relates, generally, to temperature sensing and indicating devices and, more specifically, to a temperature sensing and indicating device which is inserted into a particular medium in order to sense and indicate the temperature of the particular medium.

The accurate and instantaneous sensing and indicating of a medium's temperature is critically important in many industries. These industries may be industrial and chemical processes and food preparation, to name just a few. The most accurate and expedient manner in which to measure the temperature of a medium is by inserting a temperature sensing device into the medium. The basic thermometer is such a device.

The processes involved with the above-mentioned industries require very accurate and very immediate temperature sensing and indicating. The basic thermometer with its mercury bulb and tube does not provide such accuracy and immediacy. Because of this other means of sensing temperature have been developed, such as thermocouples, thermistors and diodes. These devices typically convert temperature sensed into a signal which is then sent to an instrument which converts the signal into a readable temperature display.

Although those devices are well-known in the art, they do not, by themselves provide for the accuracy and ease of use necessary for many applications. Internal variables, such as calibration requirements, or external variables, such as shock from impact, must not compromise the integrity of the accuracy of a temperature sensing and indicating device when it is being inserted into a medium. The temperature so sensed must be easily and quickly, virtually instantaneously, readable or, in some manner, indicated to the user. This is especially true in food preparation.

Traditionally, in the preparation of food substances, especially meat, such as beef, individual taste preferences dictate the cooking status. Some meat, like pork, requires cooking to a certain temperature for health and safety reasons. Recently, a deadly outbreak of *E-coli* bacteria in hamburgers has accentuated the safety aspects involved with cooking beef, especially ground beef. The ability to check temperatures of "doneness" and critical temperatures in bacteria-control areas, such as bone joints, will help to insure proper food preparation. This will, also, help to preclude the seriously detrimental and disastrous outbreaks of the bacteria related illnesses and, correspondingly, limit the liability exposure of restaurants or private food preparers.

A device for use in food preparation is taught by U.S. Pat. No. 3,504,544 to J. Tymkewicz, a co-inventor of the present invention. The device taught in the '544 patent was an insertion type temperature sensing and indicating device. It employed a movable probe with a similarly moveable temperature sensor therewithin. This device is limited in that the movable probe resulted in stress on the wire connections of the temperature sensor, and was sensitive to physical shock if dropped or severely impacted. Also, it did not provide a means for retaining the visual indication when the device was withdrawn from the medium. Accordingly, for the user to be able to see the temperature the temperature sensor had to be kept in the medium requiring the user to be in very close proximity to the medium being sensed.

A need exists, therefore, for an insertion temperature sensing and indicating device which has a temperature sensor which safely senses the temperature of a medium, can withstand a physical shock from dropping or a severe impact and has the ability to hold the visual indication when the temperature sensor is removed from the medium.

SUMMARY OF THE INVENTION

The present invention provides a device to satisfy the aforementioned need.

Accordingly, the present invention relates to a temperature sensing and indicating device, comprising a housing and an arm, which is retractable and extendible into and out of the housing, such that the length of the arm external to the housing can be varied in a predetermined manner. A probe having a temperature sensor therewithin is enclosed by the arm such that varying the external length of the arm exposes varying lengths of the probe whereby the exposed length of the probe is designed to be inserted into a medium such that the temperature sensor senses the temperature of the medium. A display provides a visual indication of the temperature sensed by the temperature sensor.

In another aspect, the present invention relates to a temperature sensing and indicating device, comprising a temperature sensor which senses the temperature of a medium and converts the temperature sensed into a signal. A linearizer/amplifier receives the signal from the temperature sensor, amplifies and conditions the signal and produces a temperature-proportional output voltage. An analog to digital converter receives the temperature-proportional output voltage and converts it into a temperature-proportional digital signal. A microprocessor controls the food temperature sensing and indicating device. The microprocessor has a memory containing temperature calibration values such that the microprocessor receives the temperature-proportional digital signal from the analog to digital converter, compares the temperature-proportional digital signal to the calibration values in the memory and converts the temperature-proportional digital signal into a driver input signal. A display driver receives the driver input signal from the microprocessor and converts the driver input signal into a display input signal. A display receives the display input signal from the display driver whereby the display driver drives the display causing the display to provide a visual indication of the temperature sensed by the temperature sensor.

In yet another aspect, the present invention relates to a temperature sensing and indicating device, comprising a housing and an arm, which is retractable and extendible into and out of the housing, such that the length of the arm external to the housing can be varied in a predetermined manner. A probe having a temperature sensor therewithin is enclosed by the arm such that varying the external length of the arm exposes varying lengths of the probe whereby the exposed length of the probe is designed to be inserted into a food substance such that the temperature sensor senses the temperature of the food substance and converts the temperature sensed into a signal. A linearizer/amplifier receives the signal from the temperature sensor, amplifies and conditions the signal and produces a temperature-proportional output voltage. An analog to digital converter receives the temperature-proportional output voltage from the linearizer/amplifier and converts the temperature-proportional output voltage into a temperature-proportional digital signal. A microprocessor controls the device. The microprocessor has a memory containing temperature calibration values such that the microprocessor receives the temperature-proportional digital signal from the analog to digital converter, compares the temperature-proportional digital signal to the calibration values in the memory and converts the temperature-proportional digital signal into first and second driver input signals. First and second display drivers receive the first and second driver input signals from the microprocessor and convert the first and second driver input signal into first and second display input signals. A display receives the first and second display input signals from the first and second display drivers whereby the first and second display driver drive the display causing the display to provide a visual indication of the temperature sensed by the temperature sensor. The visual indication is comprised of a digital numeric display and an analog display.

BRIEF DESCRIPTION OF THE DRAWINGS

Further features of the present invention will become apparent to those skilled in the art to which the present invention relates from reading the following specification with reference to the accompanying drawings in which:

FIG. 3 is an enlarged fragmentary internal view of the probe of the present invention.

FIG. 4 is a partial exploded view of the present invention depicting the base of the housing and certain of the internal components thereof.

FIG. 4A is a partial sectional detail of the base of the housing of the present invention.

DETAILED DESCRIPTION OF THE PREFERRED EMBODIMENT

Figure 1:
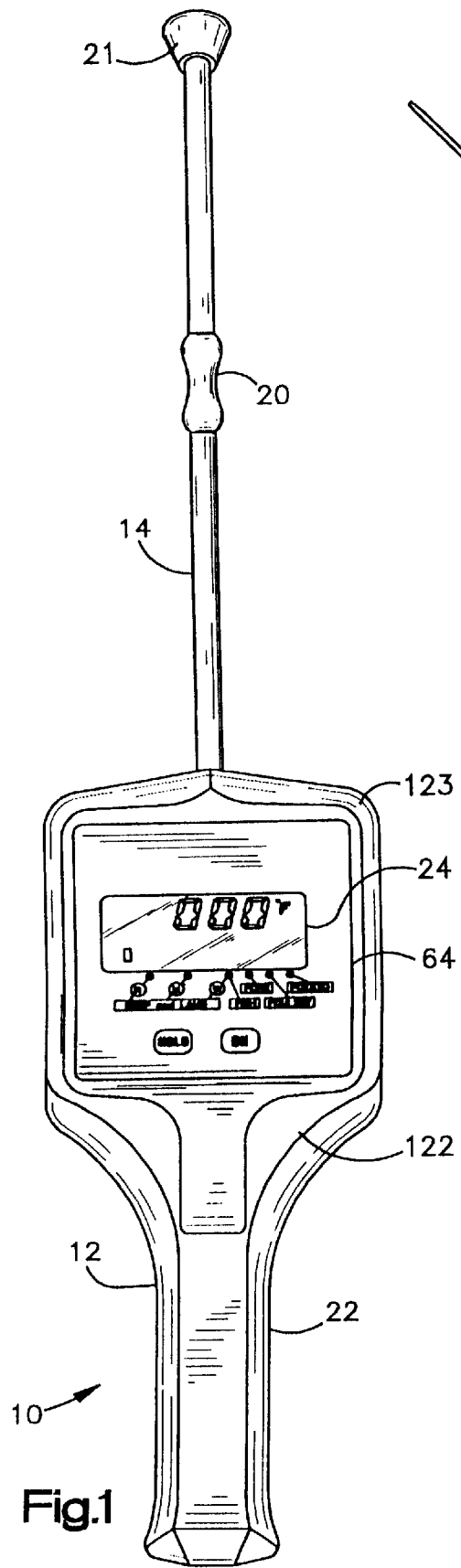
FIG. 1 is a top view of the present invention.
Figure 2:
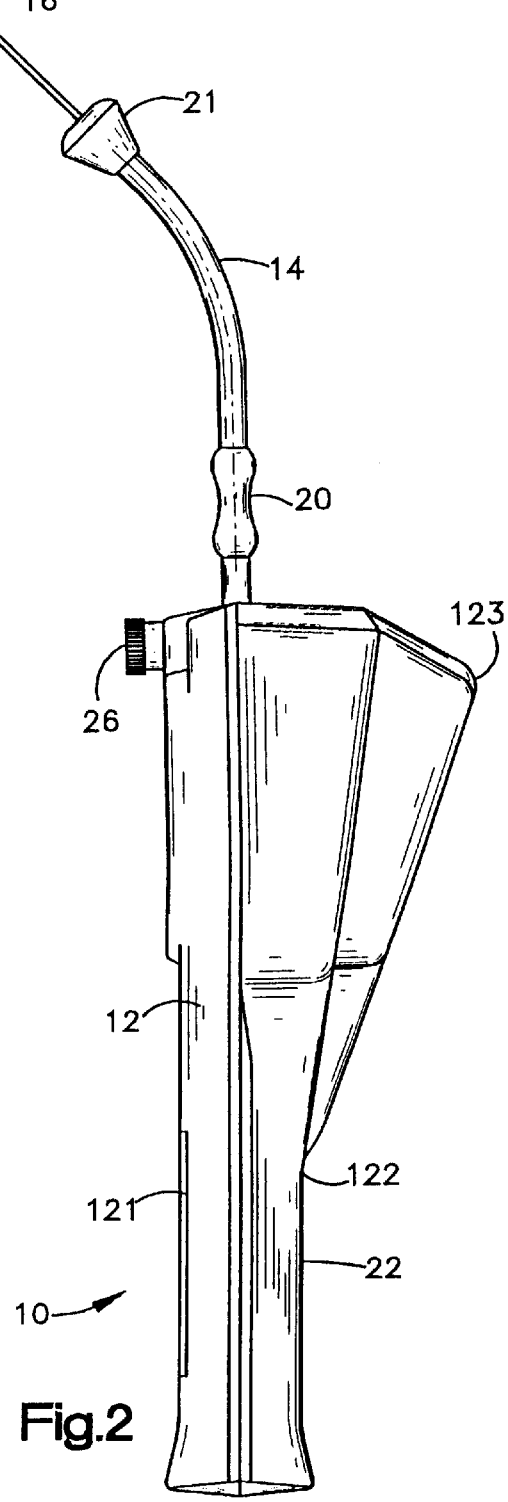
FIG. 2 is a side view of the present invention.

Referring now to the drawings and, more particularly to FIG. 1 and FIG. 2, there is shown a top view and a side view, respectively, of the present invention 10 having a housing 12, an arm 14 and a probe 16. The housing 12 comprises a base 121 and a top 122. The arm 14 is retractable and extendible into, and out of the housing 12. The retraction or extension of the arm 14 into and out of the housing 12 varies, accordingly, the length of the arm 14 that is external to the housing 12. The probe 16 is stationary and is enclosed by the arm 14. Because of this, varying the external length of the arm 14 exposes correspondingly varying lengths of the probe 16. When the arm 14 is fully extended it totally encloses the probe 16 (FIG. 1). When the arm 14 is fully retracted, it exposes the maximum length of probe 16, which may be any length as predetermined by design (FIG. 2). The arm 14 is terminated at the distal end by a stop 21. A manipulator 20 is located along the length of the arm 14. Advantageously, the arm 14 is retracted and extended by grasping and moving the manipulator 20. A handle 22 formed from, and integral with, the housing 12 allows the present invention 10 to be hand held. A display 24 and a label 64 are affixed to the inclined upper surface 123 of the top 122 of the housing 12 and are viewable therefrom by a user of the present invention 10. Lock-in knob 26 locks the arm 14 at a desired exposed length.

Referring now to FIG. 3, there is shown an enlarged fragmentary internal view of the probe 16. The probe 16 is a hollow, flexible cylindrical tube similar in size and shape to a large hypodermic needle. Advantageously, the probe 16 is constructed of stainless steel. The sensing end 28 of the probe 16 is tapered inwardly providing a small opening 281. The other end of the probe 16, the connecting end 30, is not shown on FIG. 3. A temperature sensor 32 is enclosed by the probe 16. The temperature sensor 32 terminates in a sensing point 324 at the sensing end 28. In the present invention, the sensing point 324 is spherical and protrudes partially from the small opening 281 with the taper portion of the probe 16 extending tangentially from the sensing point 324. Wires 321, 322 extend from the sensing point 324 and are suitably insulated with a layer of insulation 323. In FIG. 3 an ANSI Type K thermocouple is shown as the temperature sensor 32 with the junction of the wires forming the sensing point 324. Although a thermocouple is shown, one of ordinary skill in the art will understand that the temperature sensor 32 may be any temperature sensing device such as a thermocouple, thermistor, diode or comparable device which senses temperature and converts the temperature sensed into a signal.

Referring now to FIG. 4, there is shown a partial exploded view of the present invention 10 depicting the base 121 of the housing 12 and certain of the internal components thereof. Advantageously, the housing 12 is constructed of a molded, impact-resistant plastic. Arm 14 enters the housing 12 at arm frame 18. Arm frame 18 has a base semi-cylindrical groove 181 and a pocket 183 therethrough which divides the semi-cylindrical groove 181 into front and back sections 181a and 181b, respectively. When the housing 12 is assembled, front section 181a mates with the top semi-cylindrical groove 182 in the top 122 (not shown in FIG. 4) to form a portal through which the arm 14 retracts and extends. Pocket 183 receives arm clamp block 34. Arm clamp block 34 has an arm hole 341 and a screw hole 342. The circumference of the arm hole 341 is just large enough to allow the arm 14 to move freely through the arm hole 341. Lock-in knob 26 has a screw portion 261 which passes through a hole (not shown) in base 121 and then into the screw hole 342. Turning the lock-in knob 26 moves the arm clamp block 34 up or down, depending on the direction of turn. Turning the lock-in knob 26 so that the arm clamp block 34 moves down clamps the arm 14 between the top of the arm hole 341 and the base semi-cylindrical groove 181. In this manner, the arm 14 is locked in place, unable to extend or retract. Turning the lock-in knob 26 so that the arm clamp block 34 moves up releases the clamping force on the arm 14 and the arm 14 can be retracted and extended.

Still referring to FIG. 4 but, also, now to FIG. 4A, which is a partial sectional detail of the base 121, there is shown a saddle 36 attached to the arm 14. The saddle 36 has right and left ears 361, 362 extending laterally in opposite directions therefrom. The ears 361, 362 position between the base 121 and right and left arm guides 38, 40. Arm guides 38, 40 are attached to base 121 by guide screws 381 in threaded guide bosses 382. As the arm 14 is extended or retracted the saddle 36 similarly moves with the ears 361, 362 sliding under, and guided by, the arm guides 38, 40.

Still referring to FIG. 4 and FIG. 4A, the probe 16 extends past the end of the arm 14 and terminates at the connecting end 30 in a right handed angle. The connecting end 30 fits into retaining groove 42. Groove screw and washer 422 secures the connecting end 30 in the retaining groove 42. The retaining groove 42 keeps the probe 16 stationary even when arm 14 is being retracted and extended. Wires 321, 322 exit the probe 16 at the connecting end 30 and connect to the printed circuit board 44 mounted to the top 122 of the housing 12 (See FIG. 5). When the arm 14 is retracted the saddle 36 moves until it comes into contact with retaining groove base 421. At that point the arm 14 is fully retracted. When the arm 14 is extended, the saddle 36 moves until it comes into contact with the arm frame 18. At that point the arm is fully extended. The length of arm 14 travel, therefore, is the distance between the retaining groove base 421 and the arm frame 18, less the length of the saddle 36. Assembly screws 11 (one shown on FIG. 4) insert into assembly holes 15 and secure the top 122 to the base 121. A battery 68 is positioned in the handle 22.

Figure 5:
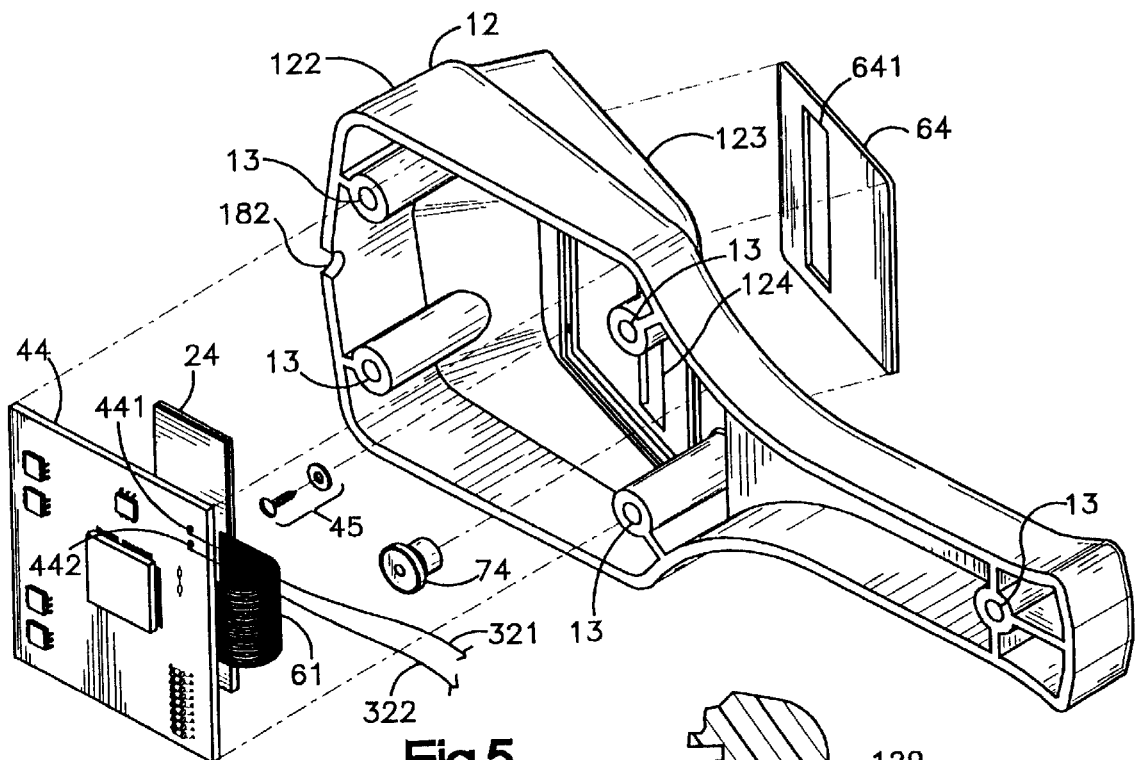
FIG. 5 is a partial exploded view of the present invention depicting the top of the housing and certain of the internal components thereof.

Referring now to FIG. 5, there is shown a partial exploded view of the present invention depicting the top 122 of the housing 12 and certain of the internal components thereof Top 122 has a top semi-cylindrical groove 182 which mates with front section 181a of base semi-cylindrical groove 181 as described above when discussing FIG. 4. Printed circuit board 44 and display 24 are connected by ribbon connector 61. Printed circuit board 44 mounts to the top 122 by retaining screws with washers 45. Wires 321, 322 connect to the printed circuit board 44 at P.C. screws 441, 442. A large, thermally conductive printed circuit pattern at the P.C. screws 441, 442 enhances the reference junction temperature sensing and response of the device. The top 122 has an inclined upper surface 123 upon which a label 64 is attached. The label 64 is a thin, flexible membrane with at least one window 641 through which the display 24 can be observed. The window 641 is constructed of a flexible material that has a frosted appearance which eliminates a glossy surface without reducing display 24 visibility in the assembled state. Because of the inclined upper surface 123, the label 64 and display 24 are tilted toward the user of the device to afford better visibility thereof. Threaded housing bosses 13 accept assembly screws 11 (See FIG. 4) to secure the top 122 to the base 121.

Figure 5A:
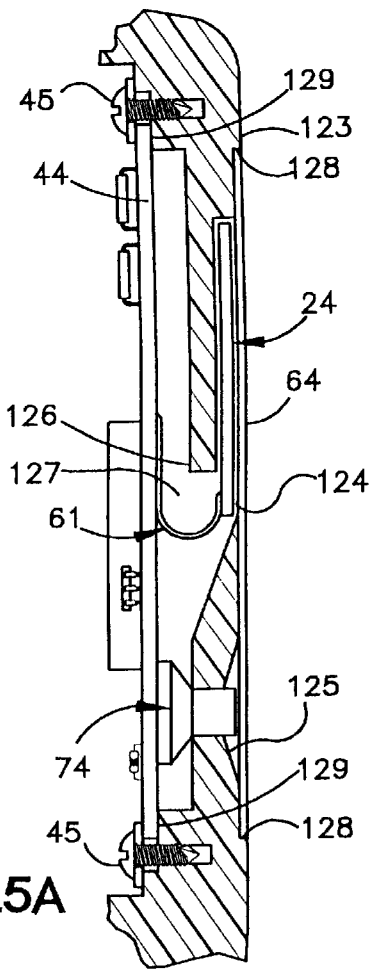
FIG. 5A is a partial sectional detail of the top of the housing of the present invention.

Still referring to FIG. 5, but, also, now to FIG 5A which is a partial sectional detail of the top 122, there is shown the attachment of the printed circuit board 44, display 24, and label 64 to the inclined upper surface 123. The inclined upper surface 123 has a display opening 124 and at least one push-button opening 125. A lip 126 extends from the inclined upper surface 123 in a manner such that it internally, partially covers the display opening 124. The space between the lip 126 and the inclined upper surface 123 forms a slot 127 through which the display 24 is inserted to access the display opening 124. A power on push-button 72 (not shown in FIG. 5) and a hold push-button 74 are constructed of elastomeric material and fit into the push-button opening 125. In the preferred embodiment of the present invention, two push-button openings 125 are utilized. An indented border 128 is cut in the inclined upper surface 123. The label 64 is attached to the inclined upper surface 123 within the indented border 128 using adhesive. When so attached, the label 64 is flush with the inclined upper surface 123 and provides a seal around the display opening 124 and push-button opening 125. Also, the label 64 is in physical contact with the display 24 which facilitates viewing the display 24 through the window 641. The retaining screws with washers 45 attach the printed circuit board 44 to the inclined upper surface 123 by clamping the printed circuit board 44 against a shoulder 129 formed in the inclined upper surface 123. The push-button opening 125 is inwardly tapered. This allows actuation of the power on push-button 72 (see FIGS. 5 and 7) or the hold push-button 74, as the case may be, by pressing the label 64, which, since it is constructed of a flexible material, deflects into the tapered portion of the push-button opening 125 and depresses the push-button onto the appropriate location of the printed circuit board 44.

Figure 6:
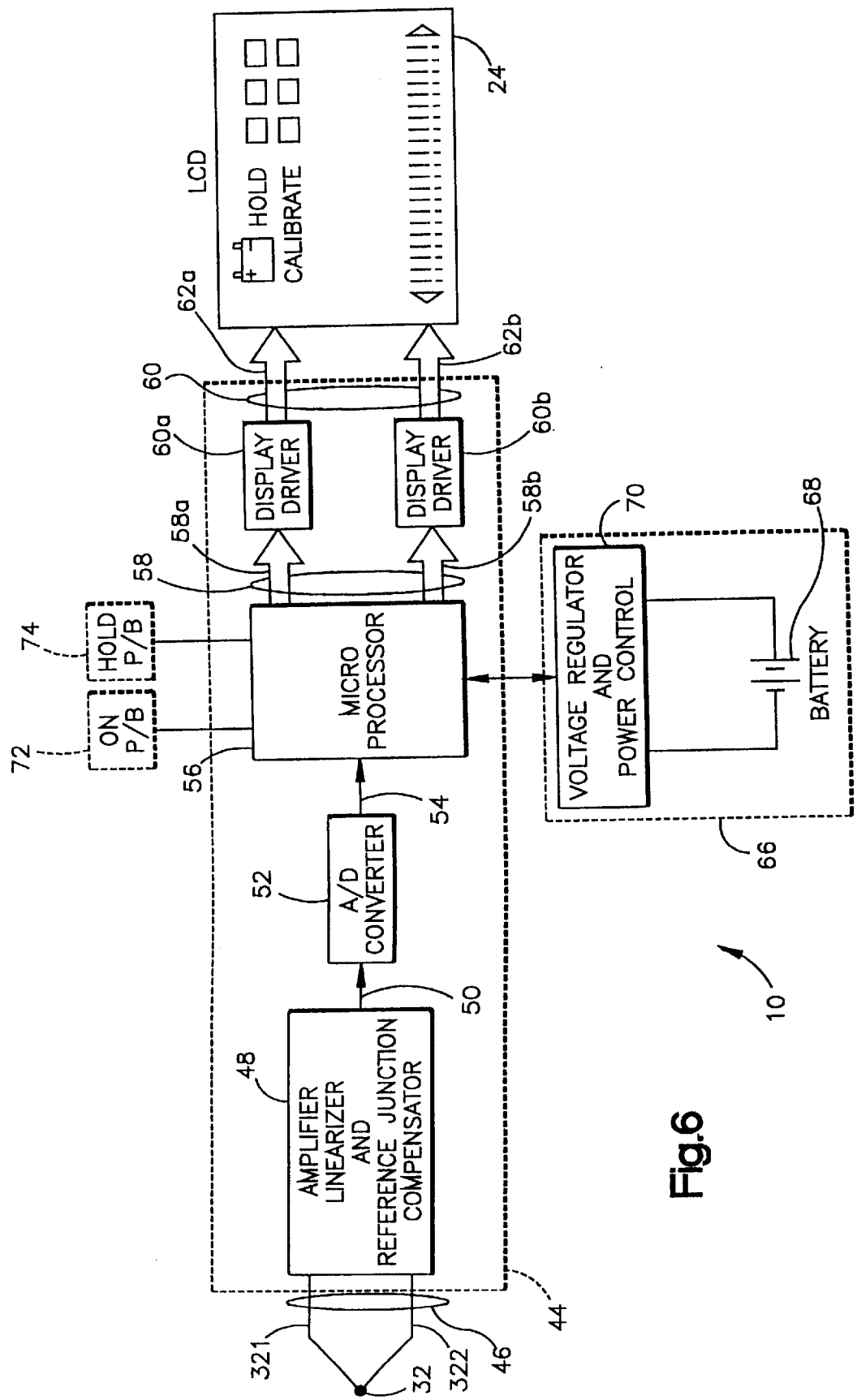
FIG. 6 is a block diagram of the present invention.

Referring now to FIG. 6, there is shown a block diagram of the present invention 10. Temperature sensor 32 converts the temperature sensed into a signal 46 proportional to the temperature sensed. Signal 46 is transmitted to the printed circuit board 44 by way of wires 321, 322. The signal 46 is inputted to the amplifier/linearizer 48. The amplifier/linearizer 48 receives the signal 46 from the temperature sensor 32, amplifies and conditions it by means of a reference junction compensator therewithin and produces a temperature-proportional output voltage 50. The reference junction compensator performs its function by adding an appropriate value of voltage to the signal 46. This is done to compensate for a portion of the signal 46 emf that is missing because the reference junction is not actually at 32° F., where the device calibration presumes it to be. The temperature-proportional output voltage 50 is inputted to an analog to digital converter 52. The analog to digital converter 52 receives the temperature-proportional output voltage 50 and converts it into a temperature-proportional digital signal 54. The temperature-proportional digital signal 54 is inputted to microprocessor 56. The microprocessor 56 has a memory containing temperature calibration values. The microprocessor 56 receives the temperature-proportional digital signal 54 from the analog to digital converter 52, compares the temperature-proportional digital signal 54 to the calibration values in its memory and converts the temperature-proportional digital signal 54 into at least one driver input signal 58 which is then inputted to at least one display driver 60. The display driver 60 outputs at least one display input signal 62 which drives a display 24. In the preferred embodiment of the present invention first and second driver input signals 58a, 58b and first and second display drivers 60a, 60b outputting first and second display input signals 62a, 62b are shown. The display 24 is driven by the display driver 60 through display input signal 62 to provide a visual indication of the temperature sensed by the temperature sensor 32. In the preferred embodiment of the invention, the display 24 is a liquid crystal display (LCD). The power source 66 for the device is a battery 68 with a voltage regulator 70.

The microprocessor 56 memory is non-volatile and is programmed with the necessary software to perform certain logic, diagnostic and safety functions related to the operation of the device. A clock in the microprocessor 56 allows it to time certain operations. The microprocessor converts temperatures sensed by the temperature sensor 32 between degrees Fahrenheit and Celsius, as required by the user for the display 24. The microprocessor 56 monitors the power source 66 and performs power saving functions to increase the longevity of the battery 68. It also is programmed with a set of factory calibration constants and user calibration constants. A power on push-button 72 and a hold push-button 74 are connected to the microprocessor 56. When the power on push-button 72 is pushed the microprocessor 56 turns the device on while the hold push-button 74, through the microprocessor 56, freezes certain functions of the device. The microprocessor 56 turns the device off after a certain period of time. When the hold push-button 74 is pushed the microprocessor 56 places the device in a hold mode which, essentially, keeps the visual indication fixed at the temperature last sensed. The microprocessor 56, though, continues to monitor the device while it is in the hold mode and will automatically turn it off after an extended period of time.

Figure 7:
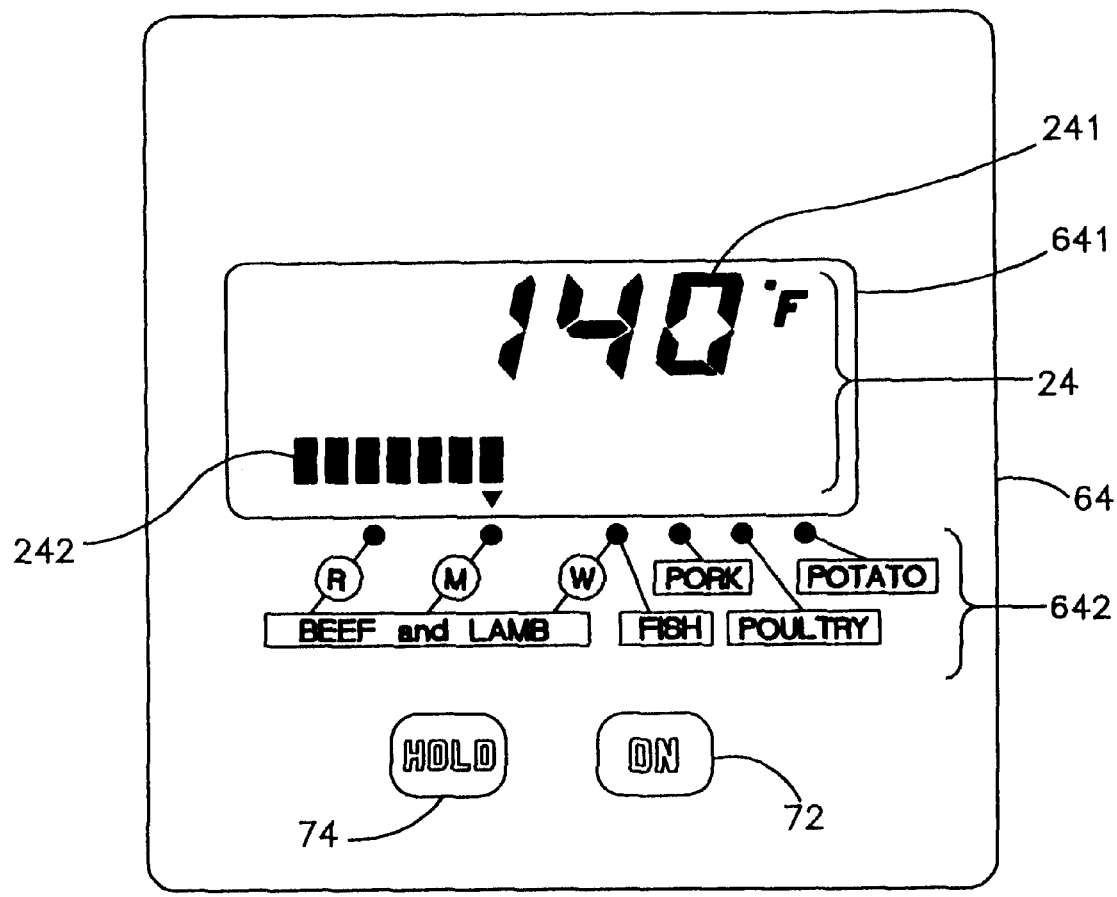
FIG. 7 is a representation of the display of the present invention.

Referring now to FIG. 7 there is shown a representation of the label 64 and display 24. The display 24 is a 3-level multiplexed liquid crystal providing a visual indication of the temperature sensed by the temperature sensor 32 (not shown in FIG. 7) through window 641. In the preferred embodiment of the present invention, the display 24 has two visual indications; a numeric digital indication 241, and an analog indication 242. The numeric digital indication 241 provides a three digit numerical visual of the temperature with whole degree resolution in Fahrenheit or Celsius and includes a negative sign for temperatures below zero. The analog indication 242 is a mark which changes in a linear fashion as the temperature sensed changes. In the preferred embodiment of the present invention, the mark is in discrete geometric figures which increase in number as the temperature sensed increases (every 3° C. or 5.4° F.). As shown in FIG. 7, the geometric figure is in two segments of a bar and tip, but can be any geometric figure or mark. The analog indication 242 coordinates with corresponding indications of the appropriate cooking temperature for a food substance 642 which are shown on the label 64. The display 24 includes annunciators to indicate degrees Fahrenheit or Celsius, whether the device is on, the state of the battery, when the device is in the hold mode and calibrate mode and whether the temperature sensed is out-of-range of the device. A minus sign is included to indicate negative values of temperature. Upon being turned on, the display 24 performs a diagnostic wake-up test and then reverts to an operating indication.

A calibration is performed at the factory at the time of manufacture. A user calibration can also be performed. Still referring to FIG. 7, but, also, now to FIG. 1, FIG. 2, and FIG. 6, a calibration offset value is programmed into the microprocessor 56 by the user placing the probe 16 into an ice bath. This creates and stores into the memory of the microprocessor 56 a ° C. deviation value relative to the factory calibration value already in the memory. The microprocessor 56 then applies this calibration offset value directly to all temperatures sensed.

After turning the device on by pushing the power on push-button 72, the user retracts the arm 14, as necessary, to expose an appropriate length of the probe 16. The probe 16 is then inserted into a medium, like a food substance. The stop 21 assures that the probe 16 is only inserted to a certain depth. A visual indication of the temperature sensed by the temperature sensor 32 is displayed instantaneously. The device will automatically turn off after a predetermined time period which is programmed into the microprocessor 56 memory. In the present invention, this time period is ninety seconds. The time period is extended in the event the user presses the hold push-button 74. In the present invention, the time period is extended to four times the normal time period (360 sec.). The user must push the hold push-button 74 again to release the device from the hold mode and to resume normal operation. In the preferred embodiment of the present invention, the numeric digital indication 241 has a range of –20° C. to +220° C. (–4° F. to +428° F.) while the analog indication 242 has a range of 42° C. to 90° C. (107.6° F. to 194° F.). The user views the analog indication 242 in relation to the indication of the appropriate cooking temperature for a food substance 642 to make an immediate and accurate determination of the cooked status of the food substance.

Now that the preferred embodiment of the present invention has been described, variations and modifications will become apparent to those skilled in the art. It is intended that such variations and modifications be encompassed in the scope of the appended claims.

What is claimed is:

1. A temperature sensing and indicating device, comprising:

a. a housing;

b. an arm, said arm being retractable and extendible into and out of said housing, such that the length of said arm external to said housing can be varied in a predetermined manner;

c. a stationary probe having a temperature sensor therewithin enclosed by said arm such that varying the external length of said arm exposes varying lengths of said probe whereby the exposed length of said probe is designed to be inserted into a medium such that said temperature sensor senses the temperature of the medium; and d. a display which provides a visual indication of the temperature sensed by said temperature sensor.

2. The device of claim 1 wherein said visual indication is a numeric digital indication of the temperature sensed by said temperature sensor.

3. The device of claim I wherein said visual display indication is an analog indication of the temperature sensed by said temperature sensor, said analog indication being a mark that changes in a linear fashion as the temperature sensed by said temperature sensor changes.

4. The device of claim 3 further comprising a label having indication of the appropriate cooking temperature for food substances thereon such that when said medium is a food substance an immediate and accurate determination of the cooked status of said food substance is achieved.

5. The device of claim I further comprising a handle such that said device may be hand held.

6. The device of claim 5 wherein said handle is formed from and integral to said housing.

7. The device of claim 1 further comprising a microprocessor such that said microprocessor controls the operation of said device.

8. The device of claim 1 wherein the temperature sensed by said temperature sensor is instantaneously displayed by said display.

9. A temperature sensing and indicating device, comprising:

a. a housing;

b. an arm, said arm being retractable and extendible into and out of said housing, such that the length of said arm external to said housing can be varied in a predetermined manner;

c. a stationary probe having a temperature sensor therewithin enclosed by said arm such that varying the external length of said arm exposes varying lengths of said probe whereby the exposed length of said probe is designed to be inserted into a medium such that said temperature sensor senses the temperature of the medium and converts the temperature sensed into a signal;

d. a linearizer/amplifier which receives said signal from said temperature sensor, amplifies and conditions said signal and produces a temperature-proportional output voltage, e. an analog to digital converter which receives said temperature-proportional output voltage from said linearizer/amplifier, and converts said temperature-proportional output voltage into a temperature-proportional digital signal;

f. a microprocessor which controls said temperature sensing and indicating device, said microprocessor having a memory containing temperature calibration values such that said microprocessor receives said temperature-proportional digital signal from said analog to digital converter, compares said temperature-proportional digital signal to said calibration values in said memory and converts said temperature-proportional digital signal into a driver input signal;

g. a display driver which receives said driver input signal from said microprocessor and converts said driver input signal into a display input signal; and h. a display which receives said display input signal from said display driver whereby said display driver drives said display causing said display to provide a visual indication of the temperature sensed by said temperature sensor.

10. The device of claim 9 wherein said microprocessor monitors the power requirements of said device and provides a power saving function in response thereto.

11. The device of claim 9 wherein said microprocessor has a nonvolatile memory.

12. The device of claim 9 wherein said visual indication is a numeric digital indication of the temperature sensed by said temperature sensor.

13. The device of claim 9 wherein said visual display indication is a linear analog indication of the temperature sensed by said temperature sensor, said analog indication being a mark that changes in a linear fashion as the temperature sensed by said temperature sensor changes.

14. The device of claim 13 further comprising a label having indication of the appropriate cooking temperature for a food substance thereon such that when said medium is a food substance an immediate and accurate determination of the cooked status of said food substance is achieved.

15. The device of claim 9 further comprising a hold push button which when pressed operates through the microprocessor to keep a visual indication of the temperature last sensed by said temperature sensor for a predetermined period of time.

16. The device of claim 9 wherein the temperature sensed by said temperature sensor is instantaneously displayed by said display.

17. A temperature sensing and indicating device, comprising:

a. a housing;

b. an arm, said arm being retractable and extendible into and out of said housing, such that the length of said arm external to said housing can be varied in a predetermined manner;

c. a probe having a temperature sensor therewithin enclosed by said arm such that varying the external length of said arm exposes varying lengths of said probe whereby the exposed length of said probe is designed to be inserted into a food substance such that said temperature sensor senses the temperature of said food substance;

d. a linearizer/amplifier which receives said signal from said temperature sensor, amplifies and conditions said signal and produces a temperature-proportional output voltage;

e. an analog to digital converter which receives said temperature-proportional output voltage from said linearizer/amplifier and converts said temperature-proportional output voltage into a temperature-proportional digital signal;

f. a microprocessor which controls said device, said microprocessor having a memory containing temperature calibration values such that said microprocessor receives said temperature-proportional digital signal from said analog to digital converter, compares said temperature-proportional digital signal to said calibration values in said memory and converts said temperature-proportional digital signal into first and second driver input signals;

g. first and second display drivers which receive said first and second driver input signals from said microprocessor and convert said first and second driver input signal into first and second display input signals; and h. a display which receives said first and second display input signals from said first and second display driver whereby said first and second display drivers drive said display causing said display to provide a visual indication of the temperature sensed by said temperature sensor, said visual indication comprising a digital numeric display and a linear analog display.

\* \* \* \* \*